US007660993B2

(12) United States Patent
Birrell et al.

(10) Patent No.: US 7,660,993 B2
(45) Date of Patent: Feb. 9, 2010

(54) CRYPTOGRAPHIC PUZZLE CANCELLATION SERVICE FOR DETERRING BULK ELECTRONIC MAIL MESSAGES

(75) Inventors: Andrew D. Birrell, Los Altos, CA (US); Michael Burrows, Palo Alto, CA (US); Edward Pearce Wobber, Menlo Park, CA (US)

(73) Assignee: Microsoft Corporation, Redmond, WA (US)

(*) Notice: Subject to any disclaimer, the term of this patent is extended or adjusted under 35 U.S.C. 154(b) by 706 days.

(21) Appl. No.: 10/806,020

(22) Filed: Mar. 22, 2004

(65) Prior Publication Data
US 2005/0210258 A1  Sep. 22, 2005

(51) Int. Cl.
*H04L 9/00* (2006.01)
(52) U.S. Cl. .................. 713/178; 713/168; 713/169; 726/2; 709/206
(58) Field of Classification Search ............... 713/1, 713/2, 188, 194, 168, 169, 178; 380/200, 380/201, 255, 277; 726/2; 709/206
See application file for complete search history.

(56) References Cited

U.S. PATENT DOCUMENTS

| 5,241,599 | A | * | 8/1993 | Bellovin et al. ............. 713/171 |
| 5,537,467 | A | * | 7/1996 | Cheng et al. ........... 379/211.02 |
| 6,134,647 | A |   | 10/2000 | Acton et al. |
| 6,955,605 | B2 | * | 10/2005 | Young et al. .................. 463/42 |
| 7,072,942 | B1 | * | 7/2006 | Maller ........................ 709/206 |
| 7,197,639 | B1 | * | 3/2007 | Juels et al. .................. 713/168 |
| 7,337,195 | B2 | * | 2/2008 | Hrle et al. ................... 707/202 |
| 7,475,055 | B2 | * | 1/2009 | Hutchison et al. .............. 707/2 |
| 2002/0069241 | A1 |   | 6/2002 | Narlikar et al. ............. 709/203 |
| 2003/0233584 | A1 |   | 12/2003 | Doucer |
| 2004/0093371 | A1 | * | 5/2004 | Burrows et al. ............. 709/201 |
| 2004/0111484 | A1 | * | 6/2004 | Young et al. ................ 709/207 |
| 2004/0181585 | A1 | * | 9/2004 | Atkinson et al. ............ 709/206 |
| 2005/0050364 | A1 |   | 3/2005 | Feng .......................... 713/201 |
| 2005/0055410 | A1 | * | 3/2005 | Landsman et al. .......... 709/206 |
| 2005/0080858 | A1 | * | 4/2005 | Pessach ...................... 709/206 |
| 2008/0189158 | A1 | * | 8/2008 | Bala et al. ...................... 705/7 |

OTHER PUBLICATIONS picoSQL, "Query Language Reference Guide", 2003, http://www.picosoft.it/picosql/Manuale, 26 pages, XP-002332130.

Mini SQL 2.0 User Guide, Hughes Technologies, Jul. 23, 1997, http://www.ictp.triests.it/msql/manual, XP-002332131, 78 pages.

(Continued)

*Primary Examiner*—Kimyen Vu
*Assistant Examiner*—Joseph Pan
(74) *Attorney, Agent, or Firm*—Woodcock Washburn LLP (57) ABSTRACT

Methods and systems are provided for a cancellation server maintaining a database of identifiers of cryptographic puzzles. A cryptographic puzzle is created from a unique identifier and a timestamp, and is attached to an electronic mail message, along with the puzzle's solution. The recipient verifies that the solution is correct and that the timestamp is current, and further queries the cancellation server with the puzzle identifier. If the identifier does not exist in the database, then the recipient knows the received message is legitimate. If the identifier already appears in the database, the received message can be automatically removed from the recipient's computer.

22 Claims, 7 Drawing Sheets

OTHER PUBLICATIONS

"Software, Hardware, Services, Crypto-Anti-Spam Measures Fall Short", *Infosecurity Today*, Nov. 2004, 1(6), 6, XP004659107.

Penny Black project home page—http://research.microsoft.com/research/sv/PennyBlack/, 2003.

M. Abadi, A. Birrell, M. Burrows, F. Dabek, and T. Wobber. "Bankable Postage for Network Services", to appear, Dec. 2003.

M. Abadi, M. Burrows, M. Manasse, and T. Wobber. "Moderately Hard, Memory-bound Functions", *Proceedings of the 10th Annual Network and Distributed System Security Symposium*, Feb. 2003.

A. Back, "HashCash—A Denial of Service Counter-Measure" (5 years on), *Tech Report*, 2002.

C. Dwork, A. Goldberg, and M. Naor, "On Memory-Bound Functions for Fighting Spam", *Proceedings of the 23rd Annual International Cryptology Conference (CRYPTO 2003)*, Aug. 2003.

C. Dwork and M. Naor, "Pricing via Processing or Combatting Junk Mail", *Lecture Notes in Computer Science* 740 (Proceedings of CRYPTO'92)}, 1993, pp. 137-147.

Stoica et al. "Chord: A Scalable Peer-to-peer Lookup Service for Internet Applications". *Proceedings of the 2001 conference on applications, technologies, architectures, and protocols for computer communications*. 2001, pp. 149-160.

M. Abadi, A. Birrell, M. Burrows, F. Dabek, and T. Wobber, Bankable Postage for Network Services, *Proceedings of the 8th Asian Computing Science Conference*, Mumbai, India, Dec. 2003.

L. von Ahn, M. Blum, and J. Langford, *Telling Humans and Computers Apart*, Communications of the ACM, Feb. 2004, vol. 47. No. 2.

U.S. Appl. No. 10/291,260, filed Nov. 8, 2002, M. Abadi et al.

\* cited by examiner

CRYPTOGRAPHIC PUZZLE CANCELLATION SERVICE FOR DETERRING BULK ELECTRONIC MAIL MESSAGES

FIELD OF THE INVENTION

This invention pertains generally to the field of distributed computing and more particularly to systems and methods for reducing unwanted behavior, such as sending unsolicited electronic messages en masse, over a computer network, such as the Internet.

BACKGROUND OF THE INVENTION

Electronic messaging, particularly electronic mail (e-mail) carried over the Internet, has become a preferred method of communication for many individuals and organizations. Unfortunately, e-mail recipients are increasingly being subjected to unsolicited and unwanted mass mailings. With the growth of Internet-based commerce, a wide and growing variety of electronic merchandisers are repeatedly sending unsolicited mail advertising their products and services to an ever-expanding universe of e-mail recipients. For example, users of the Internet who merely provide their e-mail addresses in response to perhaps innocuous appearing requests for visitor information generated by various web sites, often find, later upon receipt of unsolicited mail and much to their displeasure, that they have been included on electronic distribution lists. This can have a negative effect on the users' experiences and can diminish the productivity of users who receive such unwanted e-mail, or "spam", at their place of business.

Once a recipient finds himself on an electronic mailing list, that individual cannot readily, if at all, remove his address from it, thus effectively guaranteeing that he or she will continue to receive unsolicited mail. This occurs simply because the sender either prevents a recipient of a message from identifying the sender of that message (such as by sending mail through a proxy server) and hence precludes that recipient from contacting the sender in an attempt to be excluded from a distribution list, or simply ignores any request previously received from the recipient to be so excluded.

An individual can easily receive hundreds or thousands of pieces of unsolicited ordinary postal mail over the course of a year, or less. As bad as that is, given the extreme ease and insignificant cost through which electronic distribution lists can be readily exchanged and e-mail messages disseminated across extremely large numbers of addressees, a single e-mail addressee included on several distribution lists can expect to receive a considerably larger number of unsolicited email messages over a much shorter period of time. Furthermore, while many unsolicited e-mail messages are benign, others, such as pornographic, inflammatory and abusive material, are highly offensive to their recipients. Some (viruses) are even harmful to computers. All such unsolicited messages collectively constitute so-called "junk" mail or "spam".

One proposed method of addressing the junk-email problem requires a digital "postage stamp" to be attached to an e-mail message. More generally, these stamps can constitute a "proof-of-work." The basic idea can be summarized as follows: Whenever a sender transmits e-mail to an intended recipient, a digital postage stamp will be generated. Unlike physical postage, the sender does not spend money but instead spends CPU cycles or other computer system resources by solving a puzzle, the solution to which becomes a postage stamp. The theory is that the economics of bulk e-mail changes when e-mail is required to have postage. A single digital postage stamp is not hard to create, requiring perhaps a few seconds of computing time. Bulk e-mailers, however, rely on being able to send thousands or hundreds of thousands, or more, of messages very quickly; if they need to calculate postage stamps for every message, it will slow them down and consume CPU resources. Making spam more expensive in this manner is intended to deter spammers from operating, since a sender of a bulk e-mail in such a scheme must spend significant computational resources—at a real cost—in order to send a mass mailing, while the cost to each recipient is negligible. Another advantage to putting electronic postage on e-mail is that it can also be used as a key for filtering out spam. By adding an easily detectable and verifiable postage stamp, users would be able to filter out e-mail that does not have this postage stamp.

In some known digital postage systems, the stamp takes the form of a cryptographic puzzle and solution. The puzzles are mathematical problems possessing the general quality that they are moderately difficult to solve (i.e., they require more than a nominal amount of time and computing power), yet are easy to verify once the solution is in hand. Several researchers have investigated mathematical functions with the desired qualities, as well as protocols and systems for effectuating the use of cryptographic puzzles as digital postage stamps. These researchers include: Dwork and Naor, who proposed the use of cryptographic puzzles as a deterrent to unwanted email ("Pricing via Processing or Combatting Junk Mail," *Lecture Notes in Computer Science* 740 (Proceedings of CRYPTO '92), 1993, pp. 137-147; Adam Back, who later proposed Hash Cash for use in protecting mailing lists and in stopping denial-of-service attacks (see "Hashcash—a Denial of Service Counter-Measure, August 2002, available from http://cypherspace.org/~adam/hashcash/); Abadi, et al., who researched particularly useful mathematical functions ("Moderately Hard, memory-bound Functions", *Proceedings of the $10^{th}$ Annual Network and Distributed System Security Symposium*, February 2003); and Dwork et al., who conducted similar research ("On Memory-Bound Functions for Fighting Spam", *Proceedings of the $23^{rd}$ Annual International Cryptology Conference* (CRYPTO 2003), August 2003). The above references are hereby incorporated by reference in their entirety for all that they teach without exclusion of any parts thereof.

One problem with digital postage is ensuring that a cryptographic puzzle-solution used as a stamp for one email message cannot be re-used as a stamp for a second email message. If puzzle-solutions are allowed to be re-used, an ill-intended email sender could copy one puzzle-solution for use in multiple messages, and the recipients would have no way of knowing these messages were illegitimate. Some existing digital postage systems, such as those of the aforementioned Dwork-Naor and HashCash, address this problem by insisting that the puzzle be a mathematical function of the message itself. The puzzle-solution in such systems is thus uniquely tied to the message. Although these systems preclude a puzzle-solution from being re-used, they necessarily require that the message has already been composed prior to the puzzle-solution's creation.

Other known digital postage systems address this limitation by use of a "ticket server." The ticket server is a centralized server that generates cryptographic puzzles offline. An email sender obtains a ticket by, for example, solving a cryptographic puzzle. The ticket is attached to an email message intended for a recipient, who then verifies the ticket's validity by checking with the centralized ticket server. The ticket server "cancels" used tickets to ensure that the same ticket cannot be used more than once. Although these systems allow for creating digital postage prior to message composition, they require the email sender and recipient to use and trust the same centralized server. Such a ticket server system is described by M. Abadi, A. Birrell, M. Burrows, F. Dabek, and T. Wobber, in Bankable Postage for Network Services, *Proceedings of the 8th Asian Computing Science Conference*, Mumbai, India, December 2003, which is hereby incorporated by reference in its entirety for all that it teaches without exclusion of any part thereof.

BRIEF SUMMARY OF THE INVENTION

Embodiments of the present invention provide methods and systems for using a cancellation server to facilitate the checking of cryptographic puzzles in order to deter the sending of bulk electronic mail messages. Illustrative embodiments pertain to a system whereby the sender of email is required to attach a "stamp" in the form of a randomly generated cryptographic puzzle. Due to their mathematical properties, significant computational resources are required to generate each puzzle. Sending an email to a large number of recipients therefore is computationally expensive if stamps are required for delivery. To effectuate the system, embodiments of the invention employ a cancellation server to ensure that the "stamps" are "cancelled" and not reused. The stamps can be generated prior to composing the email messages, and the sender does not need to obtain a ticket or any information from the cancellation server or any other centralized server.

Generally, in embodiments of the invention, a cryptographic puzzle is created from a unique identifier and a timestamp, and is attached to a digital object, such as an electronic mail message, along with the puzzle's solution. The recipient of the object verifies that the solution is correct, the timestamp is current and that the timestamp and identifier correspond to the puzzle. The recipient further queries the cancellation server with the puzzle identifier and timestamp. If the identifier is truly unique, then it does not exist in the database, and the recipient knows the received object is legitimate. If the identifier is not unique, then it may already appear in the database, and the received object can be automatically removed from the recipient's computer. The invention thus provides advantages over the prior art, as it allows individual message senders to generate cryptographic puzzles independently, solve the puzzles at their leisure, and subsequently attach them to electronic mail messages. Unlike prior systems, the puzzles are independent from the attached messages, and do not need to be generated by a trusted independent source.

Furthermore, in some embodiments, multiple cancellation servers are used. The multiple cancellation servers act independently, query each other, or share databases of cancelled identifiers.

In one aspect of the invention, a cancellation server is provided for canceling cryptographic puzzles, the puzzles associated with identifiers, for use in a digital delivery system comprising an intended recipient of a digital object including a cryptographic puzzle, the cancellation server in connection with at least one database, and executing the steps of receiving the identifier associated with the recipient's puzzle, querying the at least one database with the identifier, and canceling the recipient's puzzle if the query fails, by causing an entry to be stored in the at least one database, wherein the entry comprises the identifier or information derived from the identifier. In one embodiment, the puzzles are further associated with timestamps, the server further executing the step of receiving the timestamp associated with the recipient's puzzle, and wherein the entry to be stored in the at least one database if the query fails further comprises the timestamp or information derived from the timestamp. In another embodiment, the cancellation server is in connection with a second cancellation server for providing data in the at least one database to the second cancellation server. In some embodiments, the digital object is an electronic mail message.

In accordance with another aspect of the invention, a puzzle checker is provided for verifying solutions to cryptographic puzzles, the puzzles associated with identifiers and timestamps, for use in a digital delivery system comprising an intended recipient of a digital object including a cryptographic puzzle and solution, the puzzle checker in connection with at least one cancellation server, and executing the steps of transmitting the identifier associated with the puzzle to the at least one cancellation server, and removing the digital object if a REJECT response is received from the at least one cancellation server. In one embodiment, the puzzle checker further executes the steps of verifying whether the solution solves the puzzle, and removing the digital object if the solution does not solve the puzzle. In another embodiment, the puzzle checker further executes the steps of confirming whether the timestamp is within a threshold range, and removing the digital object if the timestamp is outside the threshold range. In one version, the puzzle checker resides at the intended recipient. In another version, the puzzle checker resides at an intermediary server.

In accordance with another aspect of the invention, a puzzle creator is provided for generating and solving cryptographic puzzles for use in a digital delivery system comprising a puzzle checker in connection with at least one cancellation server and an intended recipient of a digital object including a cryptographic puzzle and solution, the puzzle creator executing the steps of generating an identifier, generating a timestamp, generating a cryptographic puzzle using the identifier and timestamp, and computing a solution to the cryptographic puzzle, whereby the puzzle, solution, timestamp and identifier are attached to the digital object for delivery to the intended recipient.

In accordance with another aspect of the invention, a method is provided for canceling cryptographic puzzles, the puzzles associated with identifiers, for use in a digital delivery system comprising at least one database in connection with a first cancellation server and an intended recipient of a digital object including a cryptographic puzzle, the method comprising the steps of receiving the identifier associated with the recipient's puzzle, querying the at least one database with the identifier, and canceling the intended recipient's puzzle if the query fails, by causing an entry to be stored in the at least one database, wherein the entry comprises the identifier or information derived from the identifier.

In accordance with another aspect of the invention, a computer-readable medium including computer-executable instructions is provided for facilitating the cancellation of cryptographic puzzles, the puzzles associated with identifiers, for use in a digital delivery system comprising at least one database in connection with a first cancellation server and an intended recipient of a digital object including a cryptographic puzzle, said computer-executable instructions executing the steps of receiving the identifier associated with the recipient's puzzle, querying the at least one database with the identifier, and canceling the intended recipient's puzzle if the query fails, by causing an entry to be stored in the at least one database, wherein the entry comprises the identifier or information derived from the identifier.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems supporting a cancellation service for cryptographic puzzles will now be described with respect to a number of embodiments; however, the methods and systems of the invention are not limited to the illustrated embodiments. Moreover, the skilled artisan will readily appreciate that the methods and systems described herein are merely exemplary and that variations can be made without departing from the spirit and scope of the invention.

The invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
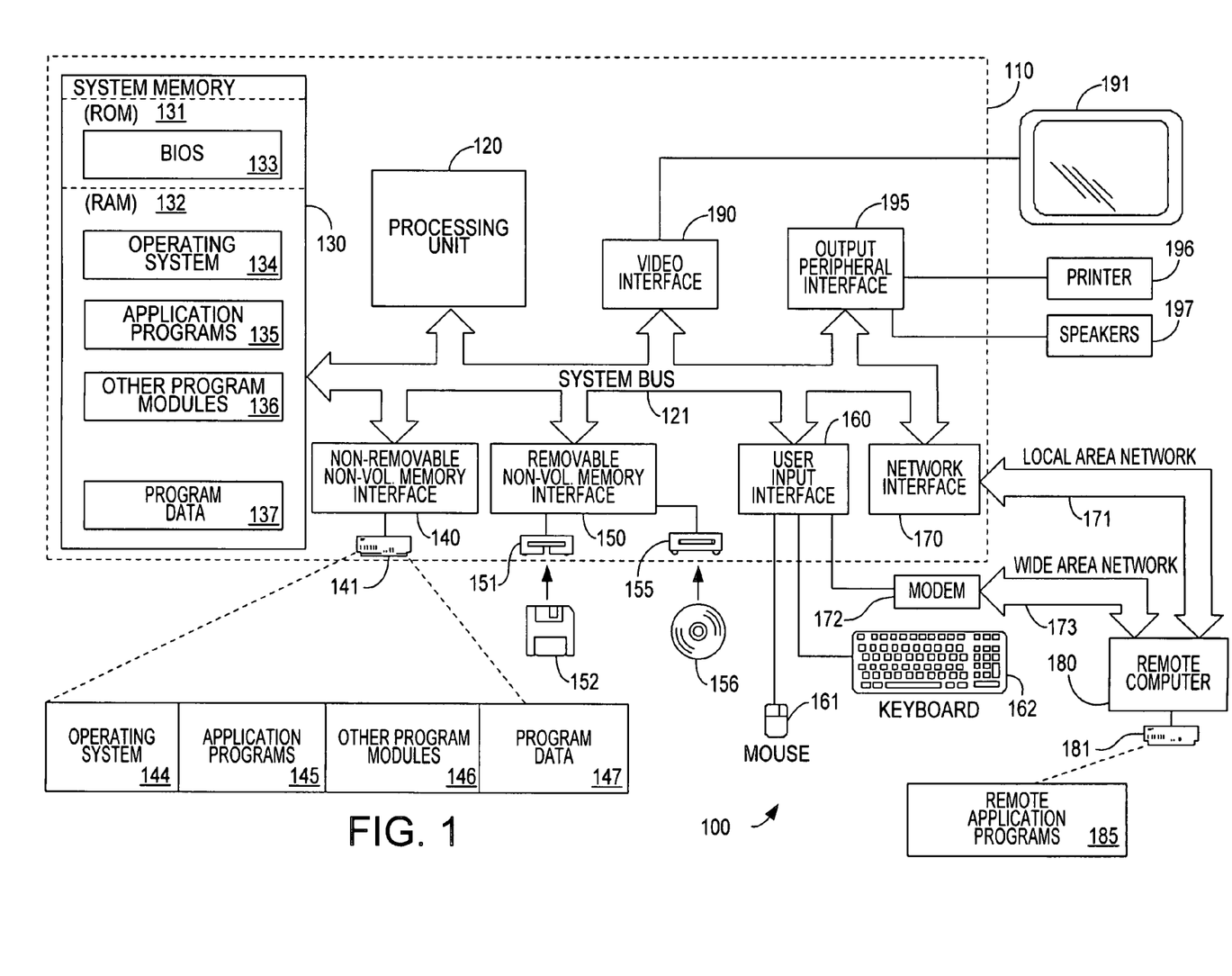
FIG. 1 is a simplified schematic diagram illustrating an exemplary architecture of a computing device for carrying out a cancellation service for cryptographic puzzles, in accordance with an embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, SmartCards, SecureDigital cards, SmartMedia cards, CompactFlash cards and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. I include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. Alternatively, the computer 110 contains a wireless LAN network interface operating on, for example, the 802.11b protocol, allowing the computer 110 to connect to the LAN 171 without a physical connection. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. Alternatively, the computer 110 contains a wireless WAN network interface operating over, for example, the General Packet Radio Service (GPRS), allowing the computer 110 to connect to the WAN 173 without a physical connection. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Additionally, variations of the computer 110 may be incorporated into other exemplary systems for implementing the invention, such as cellular phones, personal digital assistants, and the like.

Figure 2:
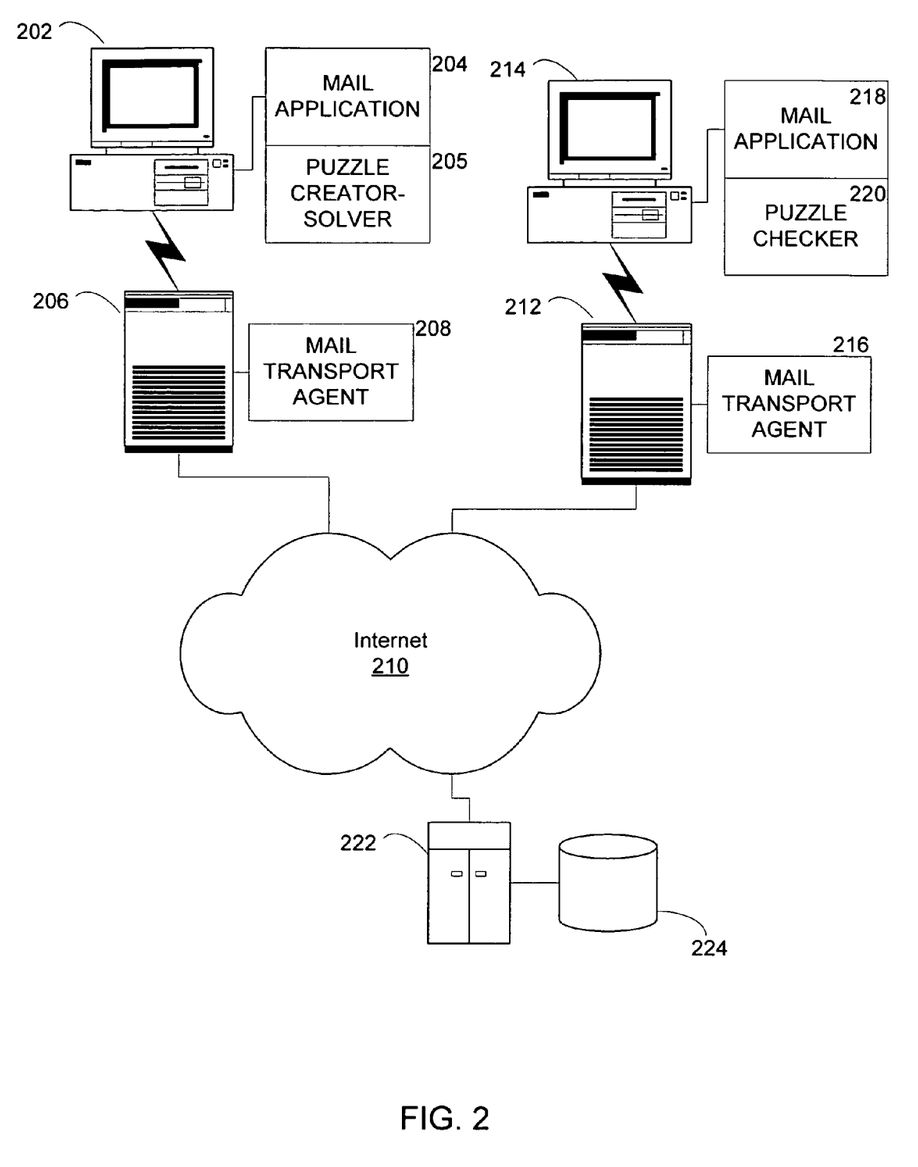
FIG. 2 is an exemplary network communication arrangement including a cancellation service, in accordance with an embodiment of the invention.

Computing devices incorporating the invention may resemble the computing device illustrated in FIG. 1, or may comprise alternative arrangements. The invention is potentially incorporated into computing devices/machines used in a variety of networking environments. Turning to FIG. 2, a simple example of a networking environment is depicted wherein the invention can be exploited. In the illustrative environment, an electronic mail message is created on a first computer 202 using a mail application 204, such as, for example, Microsoft Outlook or Microsoft Outlook Express. A puzzle creator-solver 205 on the first computer 202 uses a timestamp and a globally unique identifier to create and solve a cryptographic puzzle to be transmitted to the recipient of the electronic mail message. The puzzle preferably is from a class of puzzles that require a moderate amount of computational power to solve (requiring an amount of time, for example, on the order of a several seconds on the fastest commercially available computers), yet their solutions can be verified with only slight computational power. Such cryptographic puzzles are described more fully in, for example, the aforementioned Dwork and Naor and HashCash. Alternatively, the puzzle creator-solver is located remotely at, for example, a trusted independent puzzle creation server. In this alternative arrangement, a trusted independent authority distributes pre-solved puzzles in exchange for money, or, for example, as a customer incentive. An exemplary scheme for distributing pre-solved puzzles uses a class of puzzles that contains a trap-door, such as the Dwork-Naor scheme.

The electronic mail message, puzzle and solution are combined with the timestamp and a unique identifier to collectively form a package, which is sent from the computer 202 to a mail server 206, typically located at the Internet Service Provider (ISP) providing internet access to the computer 202. The mail server 206 uses a mail transport agent (MTA) 208 operating a mail sending protocol such as SMTP to transmit the package over the Internet 210, eventually reaching a mail server 212 located at the ISP providing internet access to the recipient's computer 214. The mail server 212 uses a MTA 216 operating a mail delivery protocol such as IMAP to deliver the package to a mail application 218 on the recipient computer 214. The mail application 214 opens the package and uses a puzzle checker 220 to verify that the included solution indeed solves the included puzzle and that the timestamp is within a given range to ensure the puzzle was recently generated. The timestamp used by the puzzle creator-solver is preferably coarsely grained, accurate only to the granularity of hours or days.

The recipient computer 214 further checks that the cryptographic puzzle has not been used in association with other mail messages by using a cancellation server 222. The cancellation server 222 stores in a database 224 the unique identifiers and timestamps of cryptographic puzzles, preferably by storing a hashed value, or other information derived from the unique identifiers and timestamps, to conserve data storage. Alternatively, a data structure stores cancellation information for the puzzles for use in conjunction with a Bloom filter. The recipient computer 214 preferably establishes an authenticated connection to the cancellation server 222, and transmits the unique identifier and timestamp from the received package to the cancellation server 222 via the Internet 210. The cancellation server 222 verifies that the recipient's unique identifier does not exist in the database 224, and notifies the recipient's computer 214 that the puzzle is valid. The cancellation server 222 then adds the unique identifier and timestamp to the database 224 to prevent future messages from using the particular puzzle. By using cryptographic puzzles with a cancellation server in this manner, a recipient of an electronic mail message has confidence that the message has been individually created for his receipt. If the cancellation server 222 is very active and cancels in its database 224 a large number of puzzles for a large number of users, then the probability that an illegitimate puzzle (i.e., one containing a reused puzzle) goes undetected becomes small.

There are numerous ways for a puzzle creator-solver 205 to generate an identifier that is, with high probability, globally unique. For example, if a strong random number generator is available, the puzzle creator-solver 205 simply generates random numbers of sufficient length. Alternatively, an unrelated, but intrinsic property of the computer 202 is used to guarantee that the sequence of identifiers from this computer does not clash with any others. For example, in one embodiment the puzzle creator-solver 205 concatenates a 48-bit Ethernet MAC address of the computer 202 and 80 random bits. Sufficient randomness is used so that it will be prohibitively difficult for an attacker to guess an identifier that a legitimate generator might create.

Figure 3A:
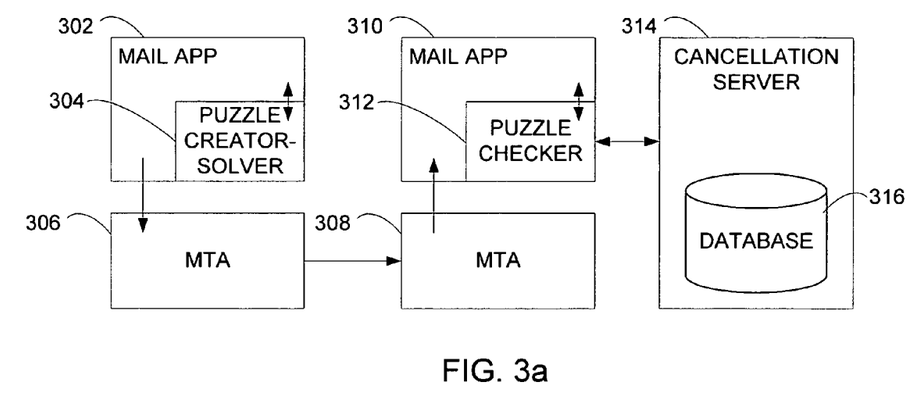
FIGS. 3a and 3b illustrate exemplary component architectures for use in canceling cryptographic puzzles, in accordance with an embodiment of the invention.

Turning attention to FIG. 3a, an embodiment of the invention is shown where the puzzle creator-solver and puzzle checker are located at the respective computers of the message sender and message recipient. In this embodiment, the sender's computer executes a mail application 302 and a puzzle creator-solver 304, which work in concert with one another. In one embodiment, a user generates a mail message using the mail application 302 and executes a "send" command by, for example, clicking a button labeled "Send" on the mail application's 302 user interface. The mail application 302, prior to actually sending the message, calls the puzzle creator-solver 304 to generate and solve a cryptographic puzzle. The puzzle creator-solver 304 generates a unique identifier and timestamp and uses them to create a cryptographic puzzle, which it then solves. The puzzle creator-solver 304 pass the puzzle, solution, timestamp and unique identifier back to the mail application 302. The mail application 302 attaches the puzzle, solution, timestamp and unique identifier to the message, and transmits the message with attachments to a mail transport agent (MTA) 306, typically located at the sender's ISP. In one embodiment, the puzzle creator-solver 304 generates puzzles in an offline process, so that a pre-generated puzzle/solution is immediately available and only minimal delay is required for the mail application 302 to transmit the message to the MTA 306.

Through standard electronic mail processing operations, the message is routed from the sender's MTA 306 to the recipient's MTA 308. The message is then downloaded to a mail application 310 operated by the recipient. The recipient's mail application 310 calls a puzzle checker 312 to verify that the attached puzzle is legitimate. The puzzle checker 312 verifies that the attached solution solves the puzzle and that the timestamp is within a given range to ensure it was recently generated. The puzzle checker 312 then communicates with a cancellation server 314 to confirm that the puzzle has not been used for other electronic mail messages. The puzzle checker 312 sends the unique identifier and timestamp of the message to the cancellation server 314, which looks up the unique identifier in its database 316. If the identifier already exists in the database, then the cancellation server 314 tells the puzzle checker 312 that the puzzle is not valid. The puzzle checker 312 in turn informs the mail application 310 that the associated message is not valid, so that it is likely a mass email and should be deleted. In this way, the mail application 310 automatically deletes illegitimate mass emails without user intervention. If the unique identifier does not already exist in the database 316, however, then the cancellation server 314 tells the puzzle checker 312 that the puzzle is valid, while adding the unique identifier to the database 316 to prevent future use of the identifier. Under this embodiment of the invention, the MTAs 306 and 308 require little or no special modification to facilitate the puzzle creation—solving—verification process.

Figure 3B:
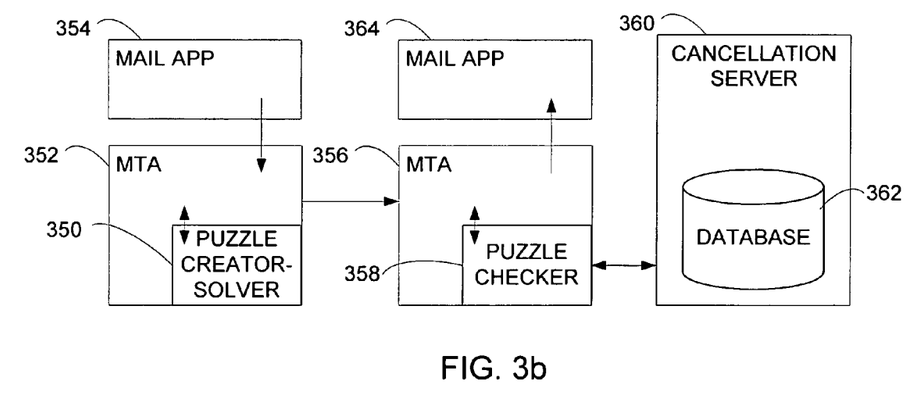

An alternative embodiment is shown in FIG. 3b, where the puzzle creator-solver 350 is located at the sender's mail transport agent 352, typically at the sender's ISP. In this arrangement, the sender's computer executes a mail application 354. A user generates a mail message using the mail application 354 and executes a "send" command by, for example, clicking a button labeled "Send" on the mail application's 354 user interface. The mail application 354 transmits the message to the sender's MTA 352. The MTA calls the puzzle creator-solver 350 to create and solve a cryptographic puzzle. The puzzle creator-solver 350 generates a unique identifier and timestamp and uses them to create a cryptographic puzzle, which it then solves. The puzzle creator-solver 350 passes the puzzle, solution, timestamp and unique identifier back to the MTA 352, which attaches the puzzle, solution, timestamp and unique identifier to the message, and transmits the message according to a mail sending protocol such as SMTP. In one embodiment, the puzzle creator-solver 350 generates puzzles in an offline process, so that a pre-generated puzzle/solution is immediately available and only minimal delay is required for the MTA 352 to re-transmit the message.

Through standard electronic mail processing operations, the message is routed from the sender's MTA 352 to the recipient's MTA 356. The MTA 356 calls a puzzle checker 358 to verify that the attached puzzle is legitimate. The puzzle checker 358 verifies that the attached solution solves the puzzle and that the timestamp is within a range of recentness. The puzzle checker 358 then communicates with a cancellation server 360 to confirm that the puzzle has not been used for other electronic mail messages. The puzzle checker 358 sends the unique identifier and timestamp of the message to the cancellation server 360, which looks up the unique identifier in its database 362. If the identifier already exists in the database, then the cancellation server 360 tells the puzzle checker 358 that the puzzle is not valid. The puzzle checker 358 in turn tells the MTA 356 that the associated message is not valid, so that it is likely a mass email and should be deleted. In this way, the MTA 356 automatically deletes illegitimate mass emails prior to ever being received by the recipient. If the unique identifier does not already exist in the database 362, however, then the cancellation server 360 tells the puzzle checker 358 that the puzzle is valid, while adding the unique identifier to the database 362 to prevent future use of the identifier. The MTA 356, receiving confirmation from the puzzle checker 358 that the puzzle is valid, transmits the message to the mail application 364 of the recipient. Under this embodiment of the invention, the mail applications 354 and 364 of the sender and recipient require no special modification to facilitate the puzzle creation—solving—verification process, and illegitimate mass emails are prevented from reaching recipients in a process that is transparent to the user.

The present invention is not limited, however, to embodiments as illustrated in FIGS. 3a and 3b; other combinations are possible For example, in an alternative embodiment the puzzle creator-solver is located at the MTA of the sender while the puzzle checker is located at the recipient's mail application. In another embodiment, the puzzle creator-solver is located at the sender's mail application while the puzzle checker is located at the MTA of the recipient. In still other embodiments, the puzzle checker is located at an intermediate server between the MTA of the sender and the MTA of the recipient, and the message is only forwarded to the recipient's MTA if the puzzle checker finds the message legitimate.

In an exemplary arrangement, cancellation services are operated at large ISPs, such as MSN, AOL, EarthLink, etc., and such that mail destined for accounts on those ISPs have their puzzles checked with the corresponding cancellation service. This arrangement provides advantages to ISPs, who are better able to ensure that their users do not receive illegitimate mass emails. An illegitimate email addressed to, for instance, multiple recipients at msn.com using a single cryptographic puzzle would be delivered to only the first of the intended recipients—once the puzzle's unique identifier was entered into the database at the cancellation server, subsequent queries would show the puzzle invalid, and the message therefore illegitimate.

In some embodiments, a puzzle checker communicates with more than one cancellation server in order to increase the likelihood of detecting illegitimate email. Suppose, for example, that an email is sent to two different recipients, A and B, using identical cryptographic puzzles. If the two recipients use different cancellation servers, then neither will detect the invalidity of the puzzle, and the message will be delivered to both recipients. If recipient A, however, checks not only with his own cancellation service, but with a second cancellation service that happens to be the cancellation service used by B, then A will detect the invalidity of the puzzle from the second cancellation service (if user B, or another mass recipient of the puzzle, had previously checked there, entering the puzzle's unique identifier into the database).

Figure 4:
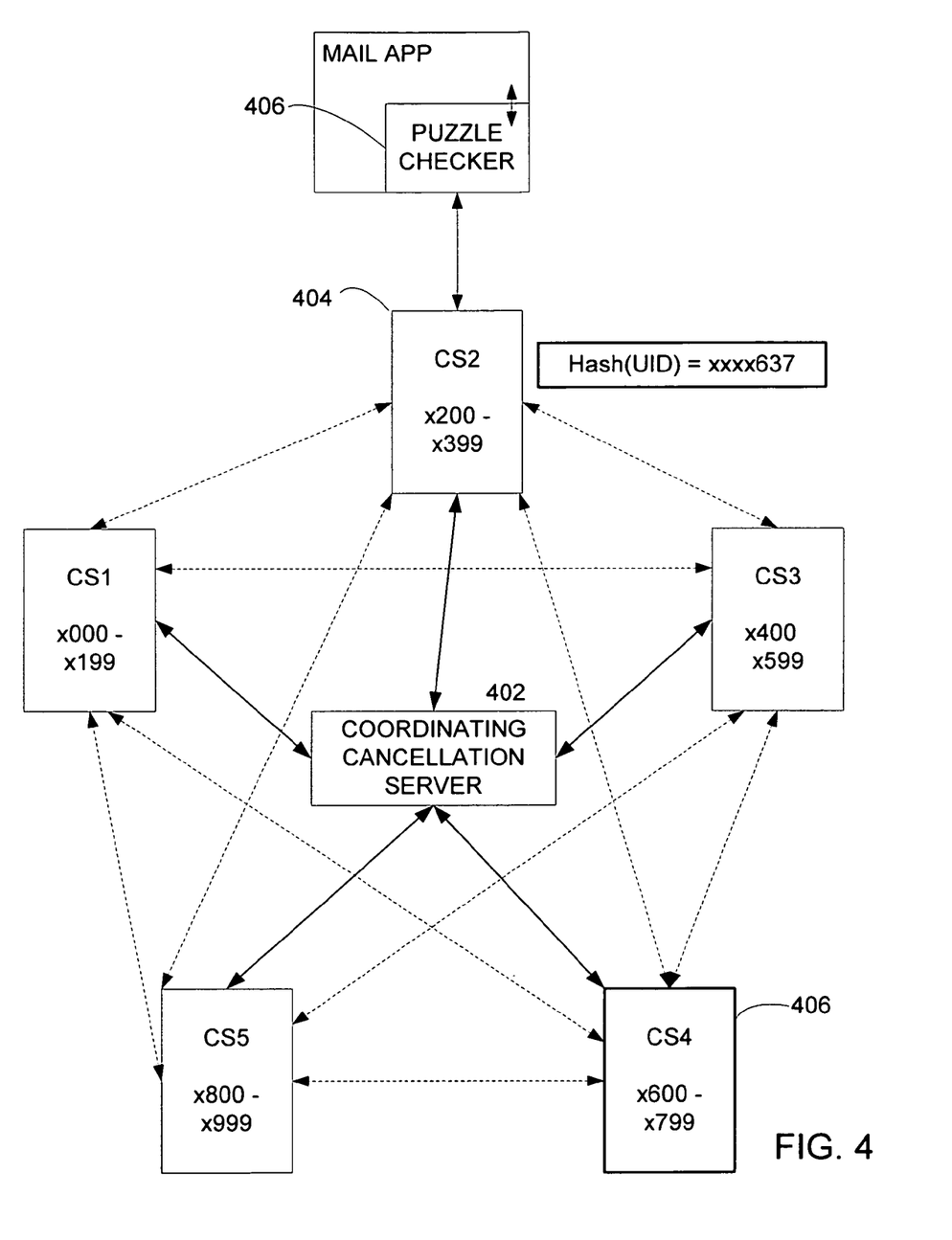
FIG. 4 illustrates a distributed system of multiple cancellation servers, in accordance with an embodiment of the invention.

In other embodiments, multiple cancellation servers communicate with one another to distribute and/or share data. One example of a distributed system of cancellation servers is shown in FIG. 4. A coordinating cancellation server 402 acts as a central coordinating point for managing the distribution of data among several cancellation servers. When a puzzle checker 406 queries one of the cancellation servers 404 with the unique identifier of a cryptographic puzzle, the queried server 404 hashes the identifier and contacts the coordinating server 402. The coordinating server 402 checks to see which of the several cancellation servers 404 is responsible for the particular unique identifier, for example, based on the three least significant digits of the hashed value. The coordinating server 402 returns the address of the appropriate cancellation server 406 to the calling cancellation server 404, which in turn queries the appropriate cancellation server 406 directly. This and similar techniques are thus used to distribute the load of identifiers across multiple cancellation servers.

An alternative arrangement using multiple cancellation servers provides for the sharing of information between servers. For example, a cancellation server at one ISP regularly transfers the contents of its database to a cancellation server at a second ISP. When a puzzle checker queries the second cancellation server with a unique identifier, the identifier effectively searches the data from both cancellation servers with the single query. This arrangement thus reduces the number of queries necessary to check multiple cancellation servers. Such an arrangement is particularly useful if the participating cancellation servers are associated with popular ISPs and mail routing agencies, such as Hotmail and AOL.

A similar arrangement using multiple cancellation servers is configured as a peer-to-peer (P2P) network. A P2P network of cancellation servers preferably does not contain a central organizing authority or hierarchy, but rather allows a puzzle checker to distribute its query among a collection of cooperating nodes holding the cancellation state. In one arrangement, a collection of peer nodes implements a distributed lookup service in which the cancellation database is distributed across a peer-to-peer network. Such a network of nodes implements a key-to-value mapping function for a large collection of keys. In this case, puzzle identifiers are used as keys. If a mapping exists for a given key, the corresponding puzzle has been cancelled. A preferred mechanism for enabling such a P2P network is described in Stoica et al., "Chord: A Scalable Peer-to-peer Lookup Service for Internet Applications", *Proceedings of the* 2001 *conference on applications, technologies, architectures, and protocols for computer communications.* 2001, pp. 149-160, which is hereby incorporated by reference in its entirety for all that it teaches without exclusion of any part thereof.

Using multiple cancellation servers provides several benefits: each individual puzzle checker need not rely on the same collection of cancellation servers; cancellation servers trusted by a recipient need not be trusted by the sender; and, with sufficient redundancy among the cancellation servers, a cancellation system could be hosted by mutually suspicious neighbors forming a peer-to-peer network.

In accordance with an embodiment of the invention, multiple puzzles and solutions are included in messages intended for multiple recipients. A preferred embodiment includes mail transport agents, such as SMTP servers, that make sure each copy of each message it sends has the correct number of puzzle-solutions. Since SMTP forwarders commonly need to manipulate headers of the messages they forward, an SMTP forwarder is easily modified to ensure that unique puzzle-solutions are bundled with messages destined for different mail transport agents. For example, if a message is intended for 10 recipients at 5 different mail servers, and the message has 10 unique puzzle-solutions, then the SMTP server makes sure that two unique puzzle-solutions are bound with the message copy destined for each of the five mail servers. Similarly, when the target mail server delivers the destination messages, each recipient only receives a single unique puzzle-solution (in those embodiments where the puzzle checking is performed at the recipient's mail application). Each recipient preferably does not receive any puzzle-solutions that are received by other recipients of the message. This prevents a recipient from prematurely invalidating a copy of the message intended for another recipient by canceling the puzzle's unique identifier with a cancellation server. Additionally, by performing the puzzle-solution distribution at the mail transport agent level, a recipient does not need to determine which of the multiple puzzle-solutions is intended for him—a problem worsened if some recipients are "hidden" using a blind carbon copy function.

The strategy just described to ensure unique puzzle-solutions for individual recipients of a single email message is similarly employed by managers of distribution lists, in an embodiment of the invention. The message sender creates a sufficient number of puzzle-solutions and passes them to the distribution list manager along with his message to be distributed. The distribution list manager then divides the puzzle-solutions between the copies of the message that it forwards to the distribution list subscribers. In this way, the sender creates puzzle-solutions for recipients who may not be known to him, but are subscribers to the distribution list and thus should therefore receive his message.

Figure 5:
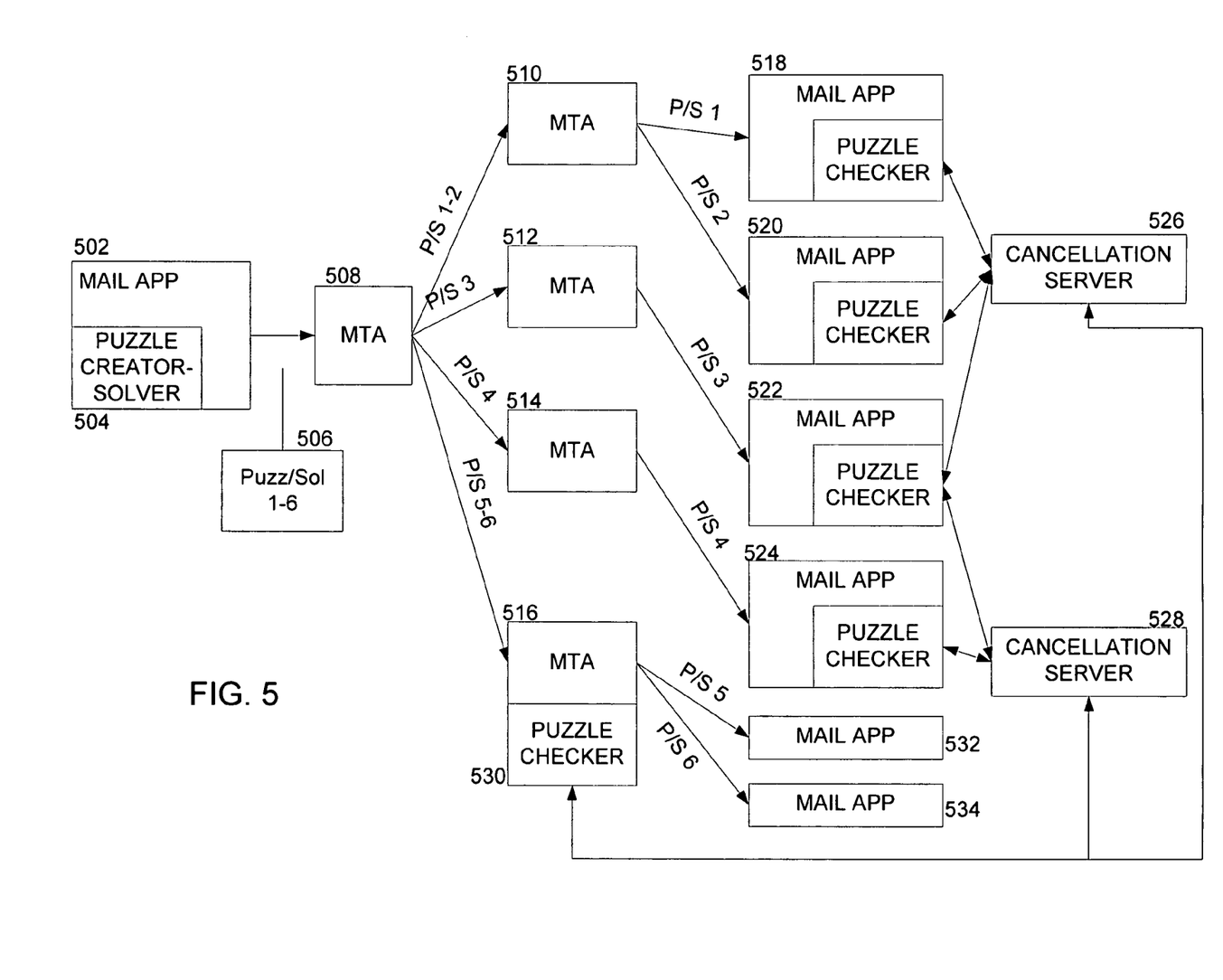
FIG. 5 depicts a network diagram showing an example of sending a single message intended for multiple recipients, using multiple cryptographic puzzles and multiple cancellation servers, in accordance with an embodiment of the invention.

FIG. 5 illustrates an example of sending a message with multiple puzzle-solutions to multiple recipients, in accordance with an embodiment of the invention. A sender uses his mail application 502 to create a message intended for six recipients, and the puzzle creator-solver 504 generates six cryptographic puzzles and solutions, P/S 1-6 506. The message and puzzle-solutions 506 are transmitted to the sender's mail server 508, which inspects the message header and notes that four different mail servers serve the six recipients. The sender's mail server 508 sends the message and two of the puzzle-solutions P/S 1-2 to a first mail server 510, one P/S 3 to a second mail server 512, one P/S 4 to a third mail server 514, and two P/S 5-6 to a fourth mail server 516. The first mail server 510 inspects the message header and delivers the message and one of the puzzle-solutions P/S 1 to a first recipient's mail application 518, while delivering the message and the second of the puzzle-solutions P/S 2 to the second recipient's mail application 520. The second mail server 512 delivers the message and puzzle-solution P/S 3 to the third recipient's mail application 522, while the third mail server 514 delivers the message and puzzle-solution P/S 4 to the fourth recipient's mail application 524. Each of these recipients' mail application works with a puzzle checker that verifies that its respective puzzle-solution has not been cancelled in one or two cancellation servers 526 and 528. The fourth mail server 516 works with a puzzle checker 530 that communicates with the two cancellation servers 526 and 528. If the puzzle checker 530 verifies that P/S 5 has not been cancelled, then the fourth mail server 516 delivers the message to the fifth recipient's mail application 532. If the puzzle checker 530 verifies that P/S 6 has not been cancelled, then the fourth mail server 516 delivers the message to the sixth recipient's mail application 534.

Figure 6:
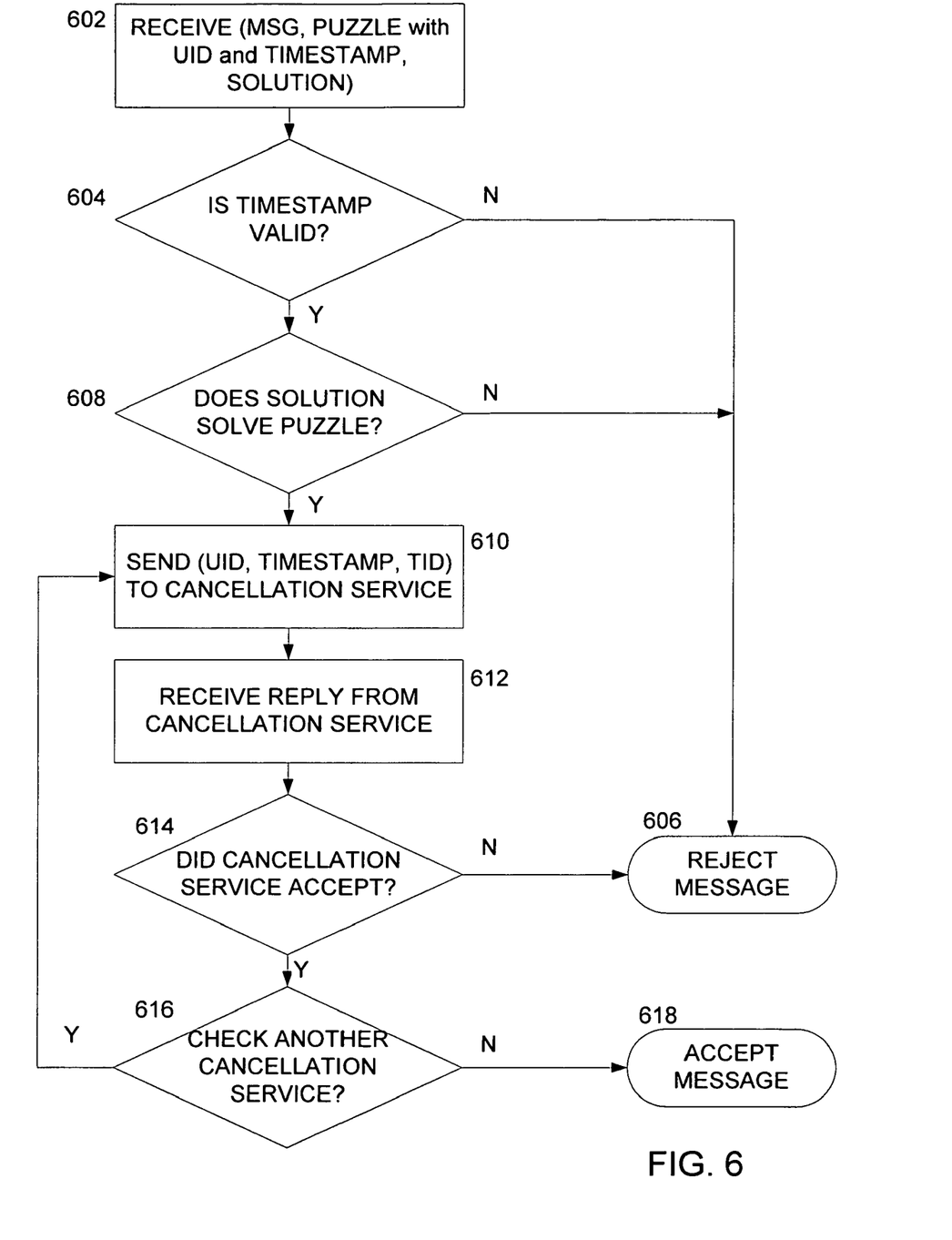
FIG. 6 is a flow diagram illustrating a method for checking cryptographic puzzles, according to an embodiment of the invention.

Turning attention to FIG. 6, a method for puzzle checking is now described, in accordance with an embodiment of the invention. The method is performed by a puzzle checker, located preferably at either a recipient's mail application or at a mail server. The puzzle checker receives a message (or other digital object) along with a cryptographic puzzle, solution, unique puzzle identifier and timestamp at step 602. The puzzle checker checks that the timestamp is valid at step 604, by, for example, comparing the timestamp to the current time with respect to some range threshold. If the timestamp is outside the range threshold (e.g., it is too old, or it is far in the future to be plausibly explained by the clock-skew), then the puzzle checker rejects the message at step 606. Otherwise, the puzzle checker verifies that the solution solves the puzzle, and that the puzzle corresponds to the identifier and timestamp, at step 608. Due to the preferred nature of the cryptographic puzzles for use in the method, verification step 608 requires relatively little computational power and time. If the solution does not solve the puzzle, then the puzzle checker rejects the message at step 606. Otherwise, the puzzle checker, at step 610, sends the unique identifier and timestamp to a cancellation service. Additionally, the puzzle checker sends, at step 610, a transaction identifier, which is a large number generated by a random or pseudo-random number generator, preferably greater than 128 bits in length. If the puzzle checker does not receive a reply from the cancellation server within some user- or puzzle-checker set interval of time, then the puzzle checker re-sends the transaction identifier, unique identifier and timestamp at 610. The puzzle checker receives a reply from the cancellation service at step 612 and inspects the reply at step 614. If the cancellation server rejected the puzzle identifier, then the puzzle checker rejects the message at step 606. If the cancellation server did not reject the puzzle, the puzzle checker decides if it is going to check with an additional cancellation service at step 616. If so, the puzzle checker returns to step 610 where it sends the unique identifier and timestamp of the puzzle to the additional cancellation service, and the subsequent steps repeat. Otherwise, the puzzle checker accepts the message at step 618.

With regard to step 606, some embodiments perform various actions on a message whose identifier has been rejected by a cancellation server. For example, one action performed in an embodiment of the invention discards and removes rejected messages from the system. An alternative action places a rejected message into a low-priority bin, allowing the recipient to subsequently view the message should he or she desire, or apply a spam filter to the message. For puzzle checkers residing at mail transfer agents, one action for rejecting the message is to cause it to be deleted and not delivered to the intended recipient. Alternatively, the puzzle checker does not cause the message to be removed, but rather marks it as having a rejected identifier. Preferably, the MTA marks the message by adding a new designated header field to the message, indicating the message identifier was rejected by a cancellation server. The MTA also removes any such designated header field that may have previously existed on the message. By reading the designated header field, downstream MTAs or mail applications can filter the message for spam, modify the message's priority setting, or perform other actions based on the cancellation server's rejection. The methods used to process messages with rejected identifiers are preferably configured according to user, MTA or ISP preferences.

Figure 7:
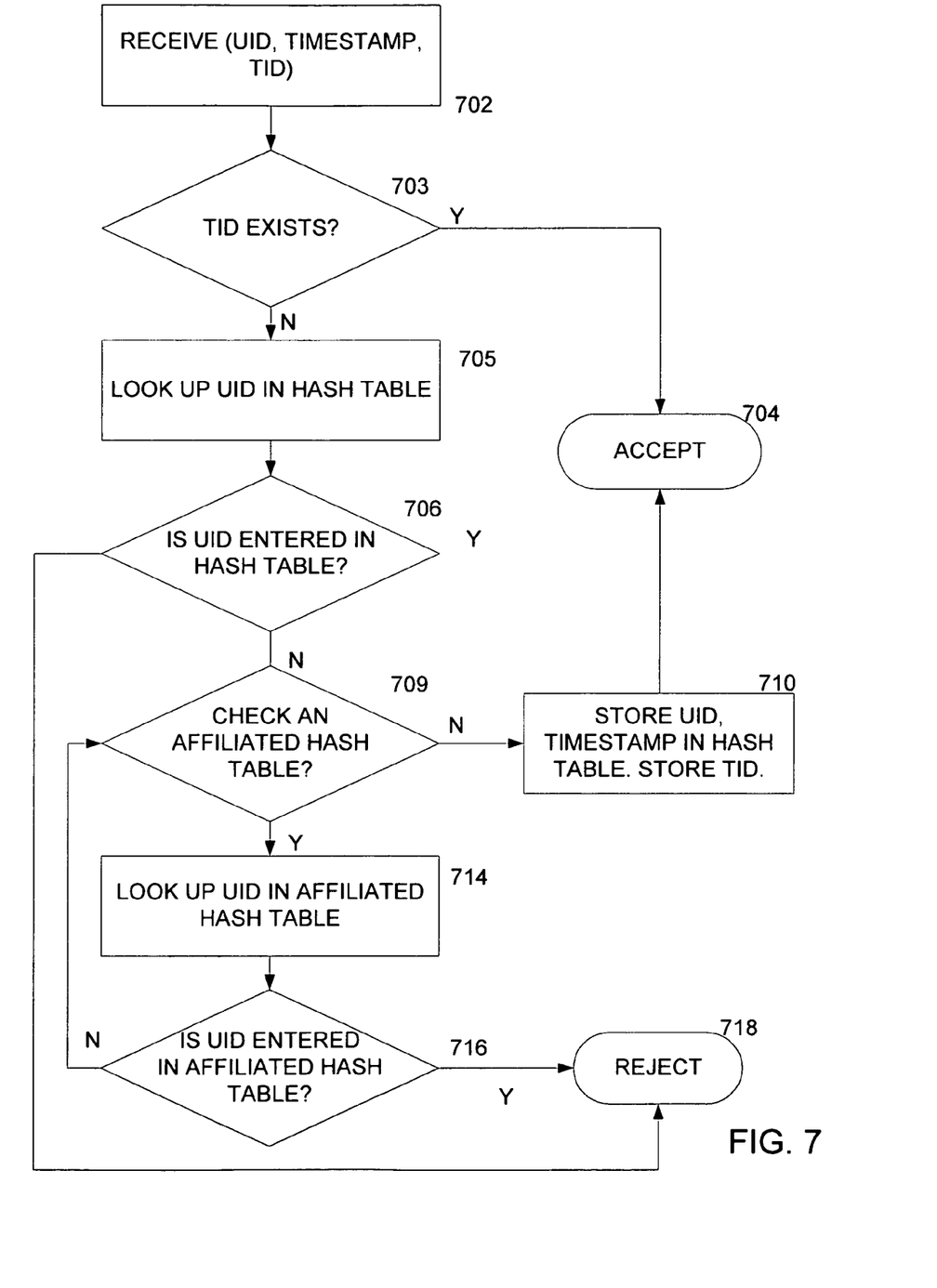
FIG. 7 is a flow diagram illustrating a method for operating a cancellation server, according to an embodiment of the invention.

Turning to FIG. 7, a method for canceling a puzzle is now described, in accordance with an embodiment of the invention. The method is preferably performed by a cancellation server in communication with a puzzle checker. The cancellation server receives a unique identifier, timestamp and transaction identifier of a cryptographic puzzle at step 702. At step 703, the cancellation server checks if the transaction identifier already exists in its database. If so, then the cancellation request is a duplicate request from, for example, a puzzle checker that did not receive a response to its initial request due to a communications failure. The cancellation server accepts the puzzle at step 704 and transmits a notification of the acceptance to the calling puzzle checker. Otherwise, the transaction is new and at step 705, the cancellation server hashes the unique identifier and looks it up in a hash table. The cancellation server determines, at step 706, whether the unique identifier exists in the hash table. If the unique identifier already exists in the hash table, then the puzzle is being reused, so the cancellation server rejects the puzzle at step 708, transmitting a notification of the rejection to the calling puzzle checker. Otherwise, the cancellation server decides whether to check an affiliated hash table at step 709. The affiliated hash table is located, for example, at a remote cancellation server in communication with the present cancellation server. If no affiliated hash table is to be checked, then the timestamp and hash of the unique identifier are stored in the cancellation server's hash table at step 710, and the cancellation server accepts the puzzle at step 704, transmitting a notification of the acceptance to the calling puzzle checker. Additionally, the transaction identifier is stored at step 710, to allow the puzzle checker to re-query the cancellation server should the notification of acceptance fail. The transaction identifier is stored for a limited time, preferably significantly shorter than the lifetime of the puzzle identifiers. Otherwise, the unique identifier is looked up in the affiliated hash table at step 714. At step 716, the cancellation server determines whether the unique identifier is entered in the affiliated hash table. If so, then the cancellation server rejects the puzzle at step 708. Otherwise, the server returns to step 709 to determine whether another affiliated hash table is to be checked.

Hash tables are preferably used in the method of FIG. 7 to allow for efficient storage of data, although any data structure may be used that is conducive to database functions. Furthermore, the hash table is preferably cleansed periodically by removing those entries whose timestamps are beyond a given threshold, for example, fifteen days. This increases performance of the cancellation server by reducing the size of the hash table. Furthermore, removing sufficiently old entries generally does not affect users because their puzzle checkers likely will reject old messages prior to calling the cancellation server, as described in the method accompanying FIG. 6.

There is also a trade-off between the uniqueness of puzzle identifiers and the size of the data structure required by a cancellation server. Smaller identifiers require less storage, but risk a greater likelihood of non-uniqueness, resulting in "false positives" by the puzzle checker. The cost of a false positive depends on the particular implementation of the puzzle checking system (e.g., some puzzle checkers delete messages with non-unique identifiers, while some puzzle checkers do not delete the messages, but rather place them in low-priority bins). This cost of false positives, in addition to the puzzle expiry time implemented by a cancellation server, are factors for consideration in choosing the length for unique identifiers. Although a 128-bit identifier, as described above with reference to FIG. 2, presents a low risk of false positives, smaller identifiers are possible in practice.

Embodiments of the invention are not limited to delivery of email messages. Embodiments of the invention are applicable generally in order to control the rate of information passing in distributed-systems applications where information is digitally delivered.

Embodiments of the invention are not limited to the use of cryptographic puzzles. As an alternative, for example, non-cryptographic puzzles such as Human Interactive Proof (HIP) puzzles are used. An exemplary HIP contains a set of distorted characters displayed on the computer monitor, and a user is asked to identify the characters. In an embodiment of the invention, a third party generates such puzzles and encodes them such that another party checks the human solution. Examples of HIP puzzles are given by L. von Ahn, Manuel Blum, and John Langford, in *Telling Humans and Computers Apart*, Communications of the ACM, February 2004, Vol. 47. No. 2, which is hereby incorporated by reference in its entirety for all that it teaches without exclusion of any part thereof.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A coordinating cancellation server of a digital delivery system, configured for executing the steps of:

communicatively coupling a first of a plurality of cancellation servers connected through the coordinating cancellation server to at least one database comprising a plurality of unique identifiers for cryptographic puzzles;

receiving at a first cancellation server an identifier associated with a cryptographic puzzle, the puzzle being attached to a digital object received from a sender, the digital object being an electronic mail message intended for delivery from a sender to a recipient distinct from the sender;

validating the received identifier by verifying that the identifier does not exist in the at least one database associated with the first cancellation server connected to said coordinating cancellation server;

querying the coordinating cancellation server from the first cancellation server for the address of a second cancellation server having a database of unique identifiers;

receiving the address of a second cancellation server from the coordinating cancellation server;

validating the received identifier further at the first cancellation server by directly querying the second cancellation server and verifying that the identifier does not exist in the database associated with the second cancellation server; and upon validating, canceling the cryptographic puzzle by storing in the at least one database an entry comprising the identifier or information derived from the identifier, and transmitting to the recipient an ACCEPT response if the identifier is validated.

2. The coordinating cancellation server of claim 1 further executing the step of transmitting to the recipient, a REJECT response if the identifier is not validated.

3. The coordinating cancellation server of claim 1 wherein the server is further configured for executing the step of receiving a timestamp associated with the cryptographic puzzle, and storing in the at least one database, if the identifier is validated, the timestamp or information derived from the timestamp.

4. The coordinating cancellation server of claim 3 further executing the step of causing an entry to be removed from the database if the timestamp falls outside a threshold range.

5. The coordinating cancellation server of claim 1 wherein verifying that the identifier does not exist in the at least one database comprises computing a hash of the identifier.

6. The coordinating cancellation server of claim 5 wherein the identifier is hashed according to a range of values for a peer-to-peer distributed lookup service.

7. The coordinating cancellation server of claim 1 wherein the first cancellation server and the second cancellation server communicate through a peer-to-peer network or through a network connection to a coordinating server.

8. A puzzle checker for use in a digital delivery system, the puzzle checker communicatively coupled with a coordinating cancellation server, and configured for executing the steps of:
   querying the coordinating cancellation server from the first cancellation server for the address of a second cancellation server having a database of unique identifiers;
   receiving the address of an identified second cancellation server from the coordinating cancellation server;
   communicatively coupling a first cancellation server through the coordinating cancellation server to at least one database within the second cancellation server comprising a plurality of unique identifiers for cryptographic puzzles;
   transmitting to the second cancellation server, an identifier associated with a cryptographic puzzle, the puzzle being attached to a digital object, the digital object being an electronic mail message intended for delivery from a sender to a recipient distinct from the sender, the puzzle checker being associated with the recipient;
   receiving a REJECT response directly from the second cancellation server communicatively coupled to the coordinating cancellation server as a result of the identifier being already present in a database of the second cancellation server; and
   processing the digital object in response to receiving the REJECT response by altering an attribute associated with the digital object such that the digital object is not forwarded to the receiver as if an ACCEPT response were received from the cancellation server.

9. The puzzle checker of claim 8 wherein processing the digital object comprises removing the digital object.

10. The puzzle checker of claim 8 wherein processing the digital object comprises marking the digital object for subsequent filtering.

11. The puzzle checker of claim 8 wherein processing the digital object comprises modifying the priority of the digital object.

12. The puzzle checker of claim 8 further executing the steps of:
   verifying whether a solution solves the puzzle, and
   processing the digital object if the solution does not solve the puzzle.

13. The puzzle checker of claim 8 further executing the steps of confirming whether a timestamp associated with the cryptographic puzzle is within a threshold range; and generating the REJECT response if the timestamp is outside the threshold range.

14. The puzzle checker of claim 8 further executing the step of:
   computing a hash of the identifier;
   wherein the transmitting step further comprises transmitting the hash of the identifier to the cancellation server.

15. The puzzle checker of claim 8 wherein the puzzle checker is located in a recipient computer.

16. The puzzle checker of claim 8 wherein the puzzle checker is located an intermediary server.

17. A method for using a cryptographic puzzle attached to a digital object for delivery from a sender to a recipient distinct from the sender through a digital delivery system, the digital object being an electronic mail message, the method comprising the steps of:
   communicatively connecting a plurality of cancellation servers through a coordinating cancellation server;
   communicatively connecting to a database in a first cancellation server and a separate database in a second cancellation server, each database comprising a plurality of unique identifiers for cryptographic puzzles;
   querying the coordinating cancellation server from the first cancellation server for the address of a second cancellation server having a database of unique identifiers;
   receiving an identifier associated with the cryptographic puzzle, the puzzle being attached to the digital object as sent by the sender;
   validating the identifier by verifying that the identifier does not already exist in the database in the first cancellation server or the database in the second cancellation server through a direct query from the first cancellation server to the second cancellation server; and
   upon validating, canceling the cryptographic puzzle by storing in each database in each cancellation server in communication with the coordinating cancellation server the identifier or information derived from the identifier, and transmitting to the recipient an ACCEPT response.

18. The method of claim 17 further comprising the step of receiving a timestamp associated with the cryptographic puzzle, and upon validating, storing in the database, the timestamp or information derived from the timestamp.

19. The method of claim 18 further comprising the step of causing an entry to be removed from the database if its timestamp falls outside a threshold range.

20. The method of claim 17 further comprising the step of transferring data from the database to a second database.

21. The method of claim 17 wherein the two databases are part of a peer-to-peer network or are communicatively connected through a coordinating server.

22. The method of claim 17 wherein the identifier is hashed to a value within a predefined range of values.

* * * * *